US008225076B1

(12) United States Patent
Coon et al.

(10) Patent No.: US 8,225,076 B1
(45) Date of Patent: *Jul. 17, 2012

(54) SCOREBOARD HAVING SIZE INDICATORS FOR TRACKING SEQUENTIAL DESTINATION REGISTER USAGE IN A MULTI-THREADED PROCESSOR (75) Inventors: Brett W. Coon, San Jose, CA (US); Peter C. Mills, San Jose, CA (US); Stuart F. Oberman, Sunnyvale, CA (US); Ming Y. Siu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/233,515

(22) Filed: Sep. 18, 2008

Related U.S. Application Data (63) Continuation of application No. 11/301,589, filed on Dec. 13, 2005, now Pat. No. 7,434,032.

(51) Int. Cl.
*G06F 9/30* (2006.01)
(52) U.S. Cl. ........................................................ 712/217
(58) Field of Classification Search .................... 712/217
See application file for complete search history.

(56) References Cited

U.S. PATENT DOCUMENTS

| 5,421,028 A | 5/1995 | Swanson |
| 5,579,473 A | 11/1996 | Schlapp et al. |
| 5,815,166 A | 9/1998 | Baldwin |
| 5,838,988 A | 11/1998 | Panwar et al. |
| 5,860,018 A | 1/1999 | Panwar et al. |
| 5,890,008 A | 3/1999 | Panwar et al. |
| 5,948,106 A | 9/1999 | Hetherington et al. |
| 5,958,047 A | 9/1999 | Panwar et al. |
| 5,978,864 A | 11/1999 | Hetherington et al. |
| 5,996,060 A | 11/1999 | Medelson et al. |
| 5,999,727 A | 12/1999 | Panwar et al. |
| 6,178,481 B1 | 1/2001 | Krueger et al. |

(Continued)

FOREIGN PATENT DOCUMENTS

JP 2003-35589 5/2003

OTHER PUBLICATIONS

Intel, IA-32 Intel Architecture Software Developer's Manual, vol. 1, pp. 11-23 through 11-25. 2004.

(Continued)

*Primary Examiner* — David Huisman
(74) *Attorney, Agent, or Firm* — Patterson & Sheridan, LLP (57) ABSTRACT

A scoreboard memory for a processing unit has separate memory regions allocated to each of the multiple threads to be processed. For each thread, the scoreboard memory stores register identifiers of registers that have pending writes. When an instruction is added to an instruction buffer, the register identifiers of the registers specified in the instruction are compared with the register identifiers stored in the scoreboard memory for that instruction's thread, and a multi-bit value representing the comparison result is generated. The multi-bit value is stored with the instruction in the instruction buffer and may be updated as instructions belonging to the same thread complete their execution. Before the instruction is issued for execution, this multi-bit value is checked. If this multi-bit value indicates that none of the registers specified in the instruction have pending writes, the instruction is allowed to issue for execution.

18 Claims, 9 Drawing Sheets

U.S. PATENT DOCUMENTS

| | | |
|---|---|---|
| 6,204,856 B1 | 3/2001 | Wood et al. |
| 6,222,550 B1 | 4/2001 | Roseman et al. |
| 6,266,733 B1 | 7/2001 | Knittel et al. |
| 6,279,086 B1 | 8/2001 | Arimilli et al. |
| 6,279,100 B1 | 8/2001 | Tremblay et al. |
| 6,288,730 B1 | 9/2001 | Duluk, Jr. et al. |
| 6,397,300 B1 | 5/2002 | Arimilli et al. |
| 6,405,285 B1 | 6/2002 | Arimilli et al. |
| 6,418,513 B1 | 7/2002 | Arimilli et al. |
| 6,434,667 B1 | 8/2002 | Arimilli et al. |
| 6,446,166 B1 | 9/2002 | Arimilli et al. |
| 6,463,507 B1 | 10/2002 | Arimilli et al. |
| 6,559,852 B1 | 5/2003 | Ashburn et al. |
| 6,658,447 B2 | 12/2003 | Cota-Robles |
| 6,704,925 B1 | 3/2004 | Bugnion |
| 6,750,869 B1 | 6/2004 | Dawson |
| 6,771,264 B1 | 8/2004 | Duluk et al. |
| 6,816,161 B2 | 11/2004 | Lavelle et al. |
| 6,819,325 B2 | 11/2004 | Boyd et al. |
| 6,919,896 B2 | 7/2005 | Sasaki et al. |
| 6,947,047 B1 | 9/2005 | Moy et al. |
| 7,015,718 B2 | 3/2006 | Burky et al. |
| 7,103,720 B1 | 9/2006 | Moy et al. |
| 7,139,003 B1 | 11/2006 | Kirk et al. |
| 7,237,094 B2 | 6/2007 | Curran et al. |
| 7,254,697 B2 | 8/2007 | Bishop et al. |
| 7,278,011 B2 | 10/2007 | Elsen et al. |
| 7,328,438 B2 | 2/2008 | Armstrong et al. |
| 7,447,873 B1 | 11/2008 | Nordquist |
| 2001/0056456 A1 | 12/2001 | Cota-Robeles |
| 2003/0097395 A1 | 5/2003 | Peterson |
| 2004/0024993 A1 | 2/2004 | Parthasarathy |
| 2004/0194096 A1 | 9/2004 | Armstrong et al. |
| 2004/0207623 A1 | 10/2004 | Isard et al. |
| 2004/0208066 A1 | 10/2004 | Burkey et al. |
| 2005/0108720 A1 | 5/2005 | Cervini |
| 2005/0122330 A1 | 6/2005 | Boyd et al. |
| 2006/0020772 A1* | 1/2006 | Hussain ............... 712/210 |
| 2006/0155966 A1 | 7/2006 | Burky et al. |

OTHER PUBLICATIONS

Intel, IA-32 Intel Architecture Software Developer's Manual, vol. 2B, p. 4-72. 2004.

Lo, et al. "Converting Thread-Level Parallelism to Instruction-Level Parallelism via Simultaneous Multithreading," ACM Transactions on Computer Systems, vol. 15, No. 3, Aug. 1997, pp. 322-354.

Tullsen, et al. "Exploiting Choice: Instruction Fetch and Issue on an Implementable Simultaneous Multithreading Processor," Proceedings of the 23rd Annual International Symposium on Computer Architecture, May 1996, pp. 1-12.

Eggers, et al. "Simultaneous Multithreading: A Platform for Next-Generation Processors," IEEE Micro, vol. 17, No. 5, pp. 12-19, Sep./Oct. 1997.

Hinton, et al. "The Microarchitecture of the Pentium 4 Processor," Intel Technology Journal Q1, 2001, pp. 1-12.

Sen et al., "Shadow Silhouette Maps" Jul. 2003, ACM transactions on Graphics 22, 3, pp. 521-526.

* cited by examiner

SCOREBOARD HAVING SIZE INDICATORS FOR TRACKING SEQUENTIAL DESTINATION REGISTER USAGE IN A MULTI-THREADED PROCESSOR

CROSS-REFERENCE TO RELATED APPLICATIONS

This application is a continuation of U.S. patent application Ser. No. 11/301,589 entitled, "SCOREBOARD FOR MULTI-THREADED PROCESSOR," filed Dec. 13, 2005, now U.S. Pat. No. 7,434,032. The subject matter of this related application is hereby incorporated herein by reference.

BACKGROUND OF THE INVENTION

1. Field of the Invention

Embodiments of the present invention relate generally to multi-threaded processing and, more particularly, to a scoreboard system and method for multi-threaded processing.

2. Description of the Related Art

Scoreboards have been used in scalar processing to keep track of registers that are busy so that instructions that need to use these registers can be prevented from being issued during the time these registers are in the busy state. A conventional scoreboard maintains a bit mask for each of the registers that are in a register file. When the bit mask is 1, this indicates that the associated register is busy and instructions that need to use this register should not be issued. When the bit mask is 0, this indicates that the associated register is not busy and instructions that need to use this register can be issued. Therefore, before any instruction can be issued, the scoreboard is checked to see if any of the registers specified in the instruction is busy or not. If none are indicated by the scoreboard as being busy, the instruction is allowed to issue.

The scoreboarding technique described above works adequately for small register files. When the number of registers in the register file becomes very large, however, the size of the scoreboard becomes proportionately large and table look-ups performed on the scoreboard to check if a particular register is busy or not become technique are often too slow to be able to support highly parallel processing architectures that execute a large number of independent threads in parallel.

SUMMARY OF THE INVENTION

The present invention provides a system and a method with which scoreboard checks and updates can be performed quickly, even when the number of threads and the size of the register file become very large.

The system according to an embodiment of the present invention includes a scoreboard memory that has separate memory regions allocated to each of the multiple threads to be processed. For each thread, the scoreboard memory stores register identifiers of registers that have pending writes. When an instruction is added to an instruction buffer, the register identifiers of the registers specified in the instruction are compared with the register identifiers stored in the scoreboard memory for that instruction's thread, and a multi-bit value representing the comparison result is generated. The multi-bit value is stored with the instruction in the instruction buffer and may be updated as instructions belonging to the same thread complete their execution. Before the instruction is issued for execution, this multi-bit value is checked. If this multi-bit value indicates that none of the registers specified in the instruction have pending writes, the instruction is allowed to issue for execution.

The scoreboard memory also stores a size indicator for each register identifier. The size indicator is used when comparing the register identifiers of the registers specified in an instruction with the register identifiers stored in the scoreboard memory for that instruction's thread. If the size indicator is 1, a normal comparison is made. If the size indicator is 2, the least significant bit of the register identifiers is masked and not compared. If the size indicator is 4, the two least significant bits of the register identifiers are masked and not compared.

The method according to an embodiment of the present invention is used to issue instructions to be executed by a multi-threaded processing unit. The method includes the steps of comparing register identifiers of registers specified in an instruction to be issued with one or more register identifiers of registers that have pending writes, and issuing the instruction for execution when the register identifiers of registers specified in the instruction to be issued does not match any of the register identifiers of registers that have pending writes.

The method according to another embodiment of the present invention is used to track the register usage of a plurality of threads using a scoreboard memory that has memory regions reserved for each of the plurality of threads. The method includes the steps of allocating a region of the scoreboard memory to each of the plurality of threads, storing register identifiers of registers that have pending writes in the memory region allocated to a thread as instructions of that thread with pending writes are issued for execution, and removing register identifiers of registers that have pending writes from the memory region allocated to a thread as instructions of that thread with pending writes are completed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
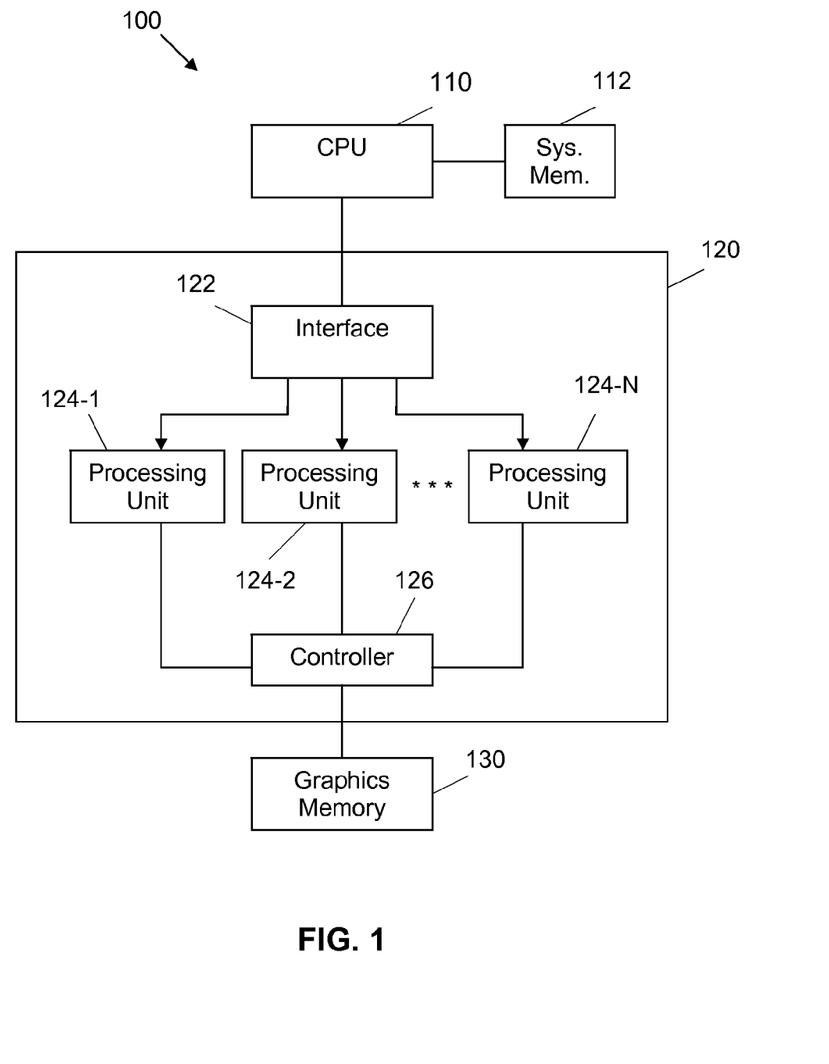
FIG. 1 is a simplified block diagram of a computer system implementing a GPU with a plurality of processing units in which the present invention may be implemented.

FIG. 1 is a simplified block diagram of a computer system 100 implementing a graphics processing unit (GPU) 120 with a plurality of processing units in which the present invention may be implemented. The GPU 120 includes an interface unit 122 coupled to a plurality of processing units 124-1, 124-2, . . . , 124-N, where N may be any positive integer. The processing units 124 have access to a local graphics memory 130 through a memory controller 126. The GPU 120 and the local graphics memory 130 represent a graphics subsystem that is accessed by a central processing unit (CPU) 110 of the computer system 100 using a driver that is stored in a system memory 112.

Figure 2:
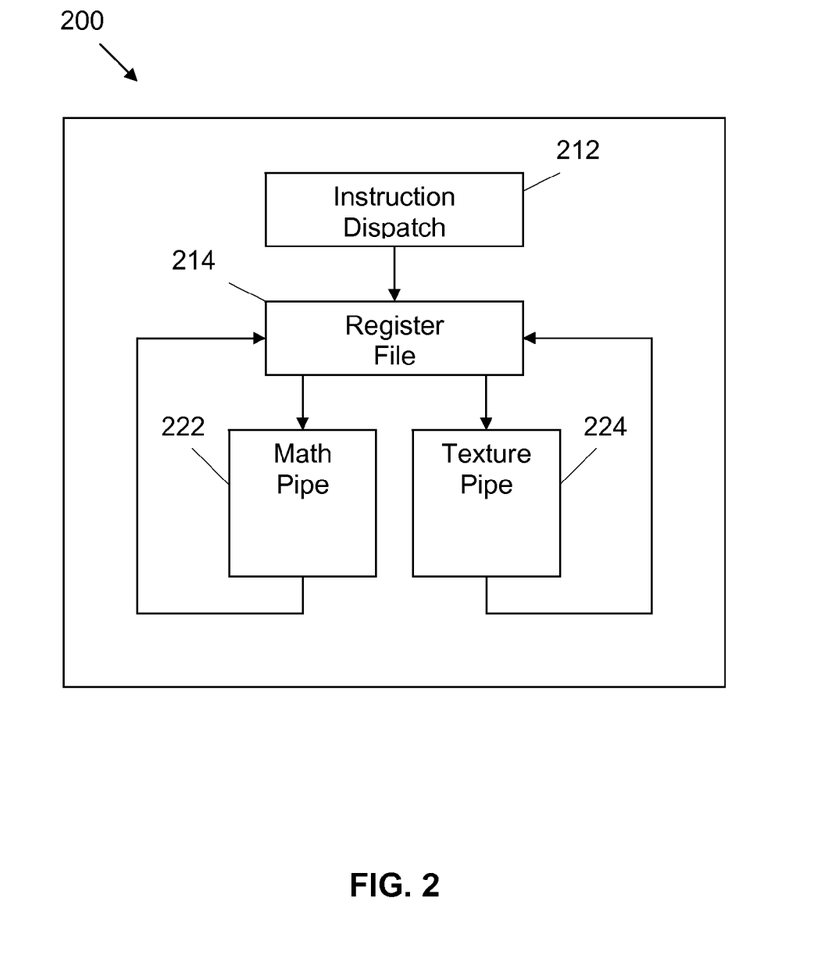
FIG. 2 illustrates a processing unit in FIG. 1 in additional detail.

FIG. 2 illustrates one of the processing units 124 in additional detail. The processing unit illustrated in FIG. 2, referenced herein as 200, is representative of any one of the processing units 124 shown in FIG. 1. The processing unit 200 includes an instruction dispatch unit 212 for issuing an instruction to be executed by the processing unit 200, a register file 214 that stores the operands used in executing the instruction, and a pair of execution pipelines 222, 224. The first execution pipeline 222 is configured to carry out math operations, and the second execution pipeline 224 is configured to carry out memory access operations. In general, the latency of instructions executed in the second execution pipeline 224 is much higher than the latency of instructions executed in the first execution pipeline 222. When the instruction dispatch unit 212 issues an instruction, the instruction dispatch unit 212 sends pipeline configuration signals to one of the two execution pipelines 222, 224. If the instruction is of the math type, the pipeline configuration signals are sent to the first execution pipeline 222. If the instruction is of the memory access type, the pipeline configuration signals are sent to the second execution pipeline 224. The execution results of the two execution pipelines 222, 224 are written back into the register file 214.

Figure 3:
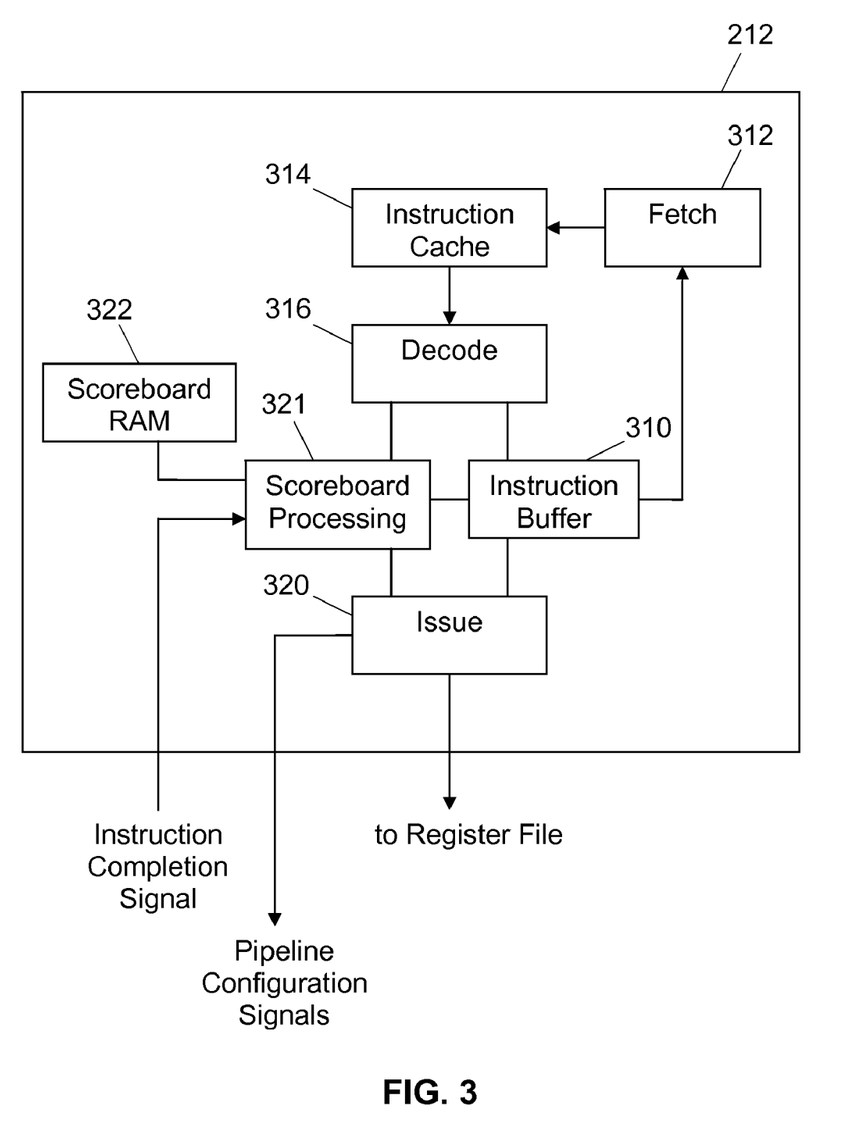
FIG. 3 is a block diagram of an instruction dispatch unit of the processing unit shown in FIG. 2.

FIG. 3 is a functional block diagram of the instruction dispatch unit 212 of the processing unit 200. The instruction dispatch unit 212 includes an instruction buffer 310 with a plurality of slots. The number of slots in this exemplary embodiment is 24 and each slot can hold up to two instructions and a multi-bit dependency mask for each of the instructions. The multi-bit dependency mask for an instruction provides an indication as to whether the instruction needs to use (depends on) a register that is currently busy. If any one of the slots has a space for another instruction, a fetch 312 is made from memory into an instruction cache 314. After the fetch 312, the instruction undergoes a decode 316 and scoreboard processing 321. During the scoreboard processing 321, register identifiers (IDs) of source and destination registers specified in the instruction are compared with the register IDs stored in a scoreboard memory 322, and a multi-bit value that represents the aggregate comparison result is generated as an output. This output is added to the instruction buffer 310 as the multi-bit dependency mask along with the instruction. In addition, the register ID of the destination register specified in the instruction is added to the scoreboard memory 322. Additional details of scoreboard processing 321 are provided below with reference to FIG. 7.

The instruction dispatch unit 212 further includes an issue logic 320. The issue logic 320 examines the instructions and their multi-bit dependency masks stored in the instruction buffer 310 and issues an instruction out of the instruction buffer 310 that is not dependent on any of the instructions in flight (e.g., an instruction having a dependency mask equal to zero), provided that there is available memory space in the scoreboard memory 322 to store the register ID of a destination register specified in the instruction. If not, the issue logic 320 does not issue the instruction until memory space in the scoreboard memory 322 becomes available. In conjunction with the issuance out of the instruction buffer 310, the issue logic 320 sends pipeline configuration signals to the appropriate execution pipeline.

Figure 4:
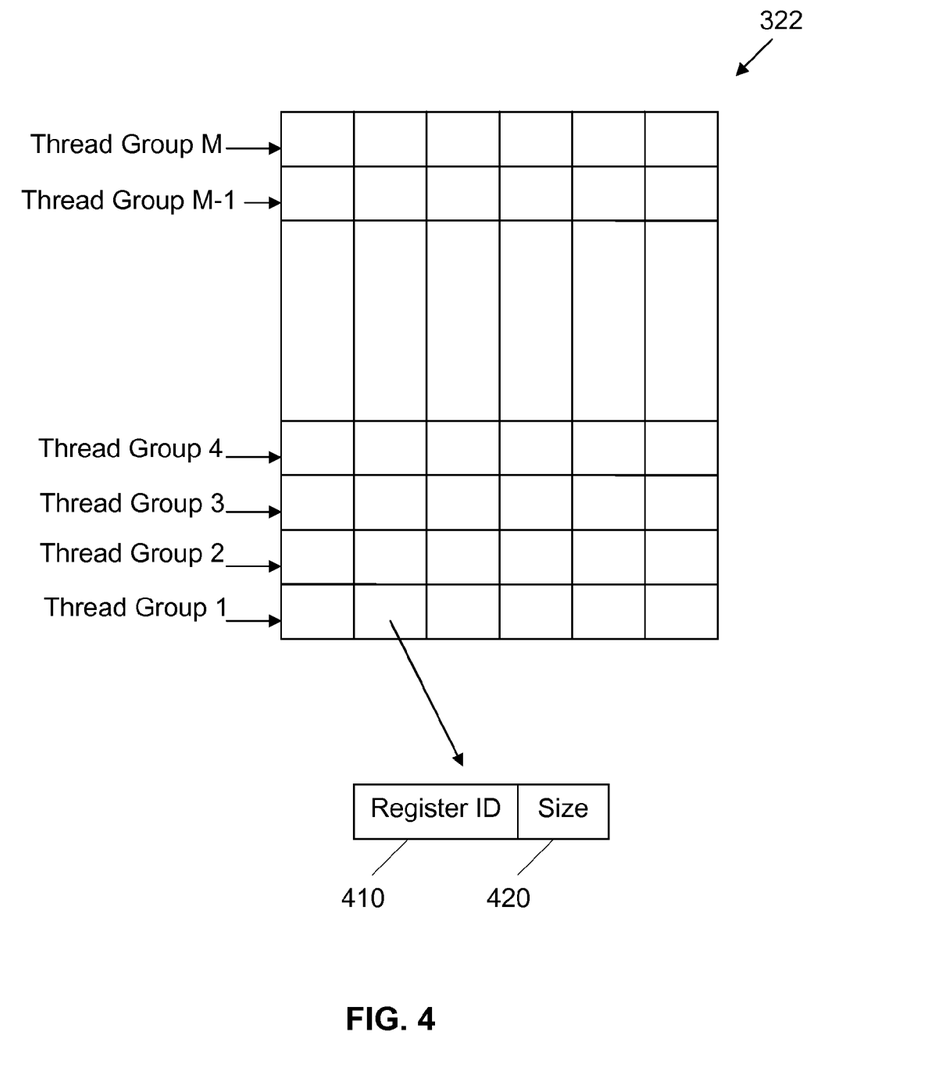
FIG. 4 is a conceptual diagram showing the contents of a scoreboard memory.

FIG. 4 is a conceptual diagram showing the contents of a scoreboard memory 322. The scoreboard memory is divided into M regions, where M is equal to the number of slots in the instruction buffer 310. Each of the M regions is allocated to a different thread and indexed in accordance with that thread's ID, and has six storage areas. Each of the six storage areas has a space for storing the register ID 410 and a space for storing the size indicator 420. The scoreboard memory 322 may be configured to reserve more than six, or less than six, storage areas per thread. If the scoreboard memory 322 is configured with insufficient number of storage areas per thread, instructions will often have to wait for one of the storage areas to clear before being issued, thus creating a bottleneck at the instruction issuing stage. If the scoreboard memory 322 is configured with too many storage areas per thread, some of the storage areas will often remain unused, thus wasting valuable memory resources.

Figure 5:
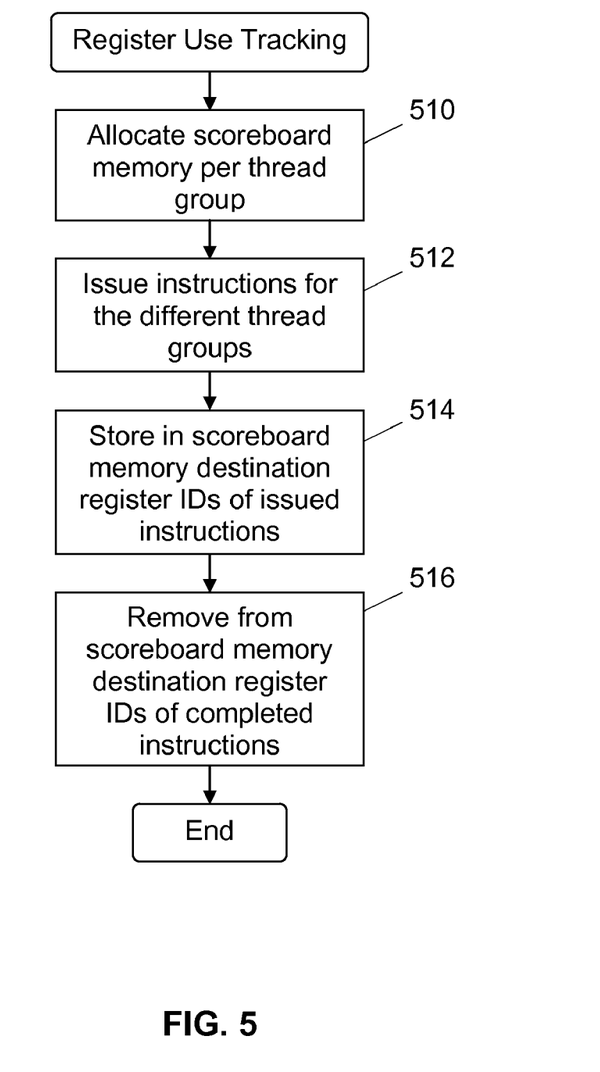
FIG. 5 is a flow diagram that illustrates the steps carried out to track register usage.

FIG. 5 is a flow diagram that illustrates the steps carried out by a processing unit 124 to track register usage by multiple threads. In step 510, each of the M regions of the scoreboard memory 322 is allocated a different thread and indexed in accordance with that thread's ID. Thereafter, instructions for the different thread groups are issued and executed (step 512). As each instruction is issued, the register ID of the destination register specified in the issued instruction is stored in the region of the scoreboard memory 322 that has been allocated to the issued instruction's thread (step 514). If there are more than one destination registers specified in the issued instruction, the register ID of the first destination register specified in the issued instruction is stored in the region of the scoreboard memory 322 that has been allocated to the issued instruction's thread. The register ID is stored in the next empty storage area in that region along with a size value indicative of the number of destination registers specified in the issued instruction. In step 516, as each issued instruction completes its execution, the storage area used for that instruction is cleared.

By storing the size indicator in the scoreboard memory 322, an instruction such as a texture fetch instruction which often specify a sequential string of registers (e.g., R0, R1, R2, R3) can be represented in the scoreboard memory 322 with a single register entry (e.g., R0) and a size indicator (e.g., 4). Thus, instead of having four storage spaces allocated to a thread being consumed by registers specified in a single instruction, only one storage space is consumed. The present invention may, however, be practiced without storing the size indicator. In such an embodiment, all register IDs stored in the scoreboard memory 322 will be representative of a single register.

Figure 6:
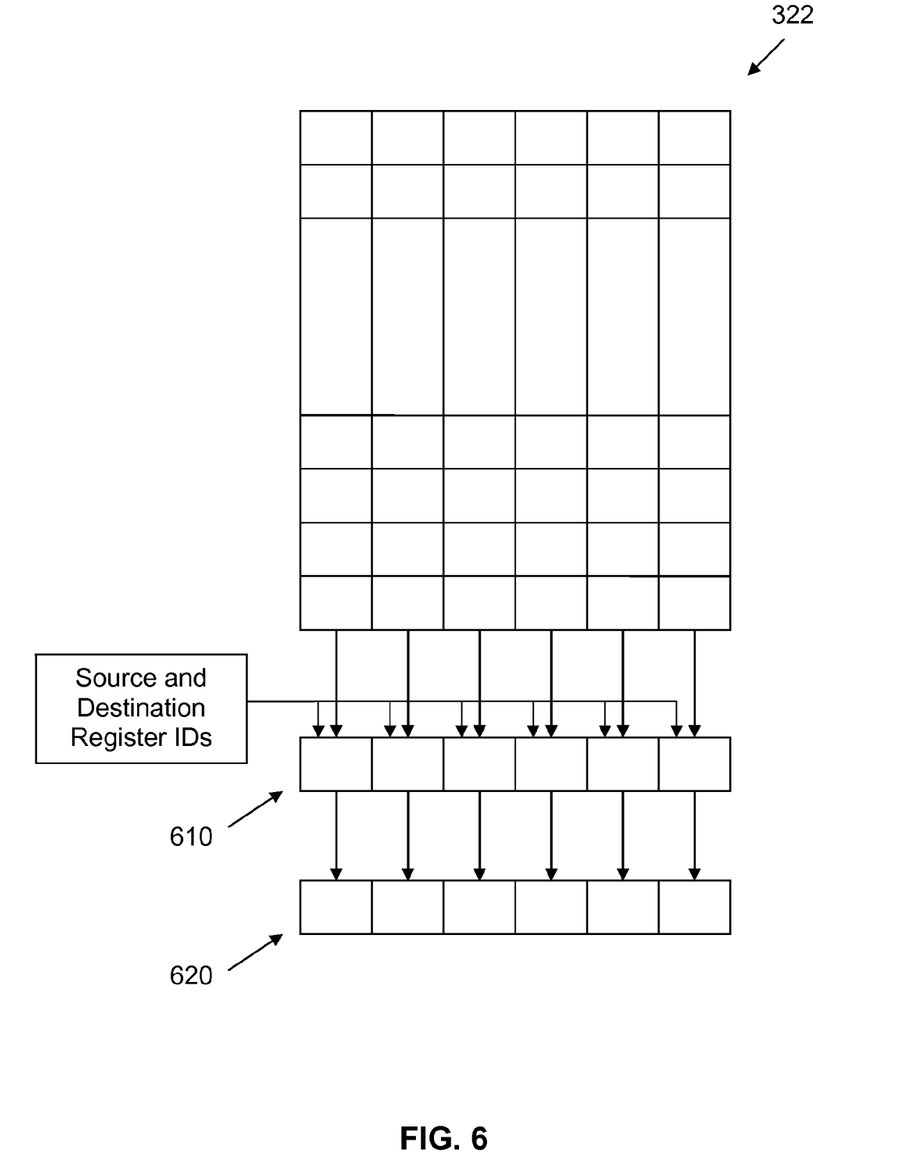
FIG. 6 is a conceptual diagram showing the inputs and outputs of comparison units.

FIG. 6 is a conceptual diagram showing the scoreboard memory 322 as an input of comparison units 610. A comparison unit 610 is provided for each of the six storage areas allocated to a memory region, and is supplied a register ID and size indicator from the corresponding storage area. The memory region from which the register IDs and size indicators are supplied to the comparison units 610 is the memory region allocated to the thread of the instruction that is undergoing the scoreboard processing 321. The other inputs to the comparison units 610 are the register IDs of source and destination registers specified in the instruction. The output 620 of the comparison units 610 is a multi-bit (in this example, 6-bit) value. This multi-bit value is also known and referred to herein as a dependency mask. Each bit of the multi-bit value corresponds to an output of one of the comparison units 610.

Figure 7:
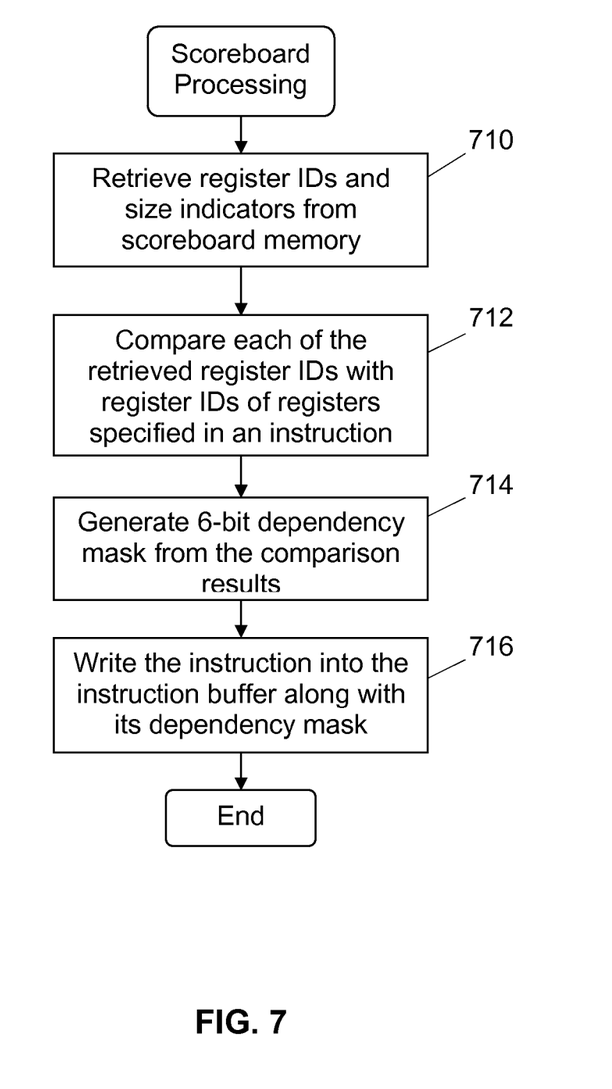
FIG. 7 is a flow diagram that illustrates the steps carried out when adding an instruction into an instruction buffer.

FIG. 7 is a flow diagram that illustrates the steps carried out during the scoreboard processing 321 after an instruction is decoded. In step 710, the region of the scoreboard memory 322 that has been allocated to the instruction's thread is accessed and the register IDs and their corresponding size indicators stored in this region are retrieved. Then, a separate comparison is made for each of these register IDs with the register IDs of the source and destination registers specified in the instruction (step 712). In step 714, a 6-bit dependency mask is generated from the comparisons carried out in step 712. For each of the comparisons, if there is a match of the register ID stored in the scoreboard memory 322 with any of the register IDs of the source and destination registers specified in the instruction, an output having a bit value of 1 is generated. If there is no match of the register ID stored in the scoreboard memory 322 with any of the register IDs of the source and destination registers specified in the instruction, an output having a bit value of 0 is generated. In step 716, the set of six single-bit outputs from the comparisons carried out in 712 is stored in the instruction buffer 310 with the instruction.

During the comparisons in step 712, if the size indicator corresponding to a register ID stored in the scoreboard memory 322 is equal to 2, the least significant bit of the register IDs being compared is masked and not compared. If the size indicator is equal to 4, the two least significant bits of the register IDs being compared are masked and not compared. If the size indicator is equal to 1, a normal comparison is made, i.e., there is no masking of the bits and all of the bits of the register IDs being compared are compared.

When performing the comparisons described above, 0, 1 or 2 least significant bits of the single register entry are masked in accordance with the size indicator and not compared. If the size indicator is 1, no bits are masked. If the size indicator is 2, one bit is masked. If the size indicator is 4, two bits are masked. As a result, a comparison of a single register entry R0 with a size indicator of 4 (e.g., 00000xx, where x represents the masked bits) against any of the registers R0 (0000000), R1 (0000001), R2 (0000010), R3 (0000011) will indicate a match. For this technique to work correctly, however, instructions that specify a sequential string of destination registers are required to begin their sequence at multiples of 4 starting with R0 (e.g., R0, R4, R8, etc.). For further improvement, a texture fetch instruction may be required to specify a single sequence of registers as both source and destination registers.

Figure 8:
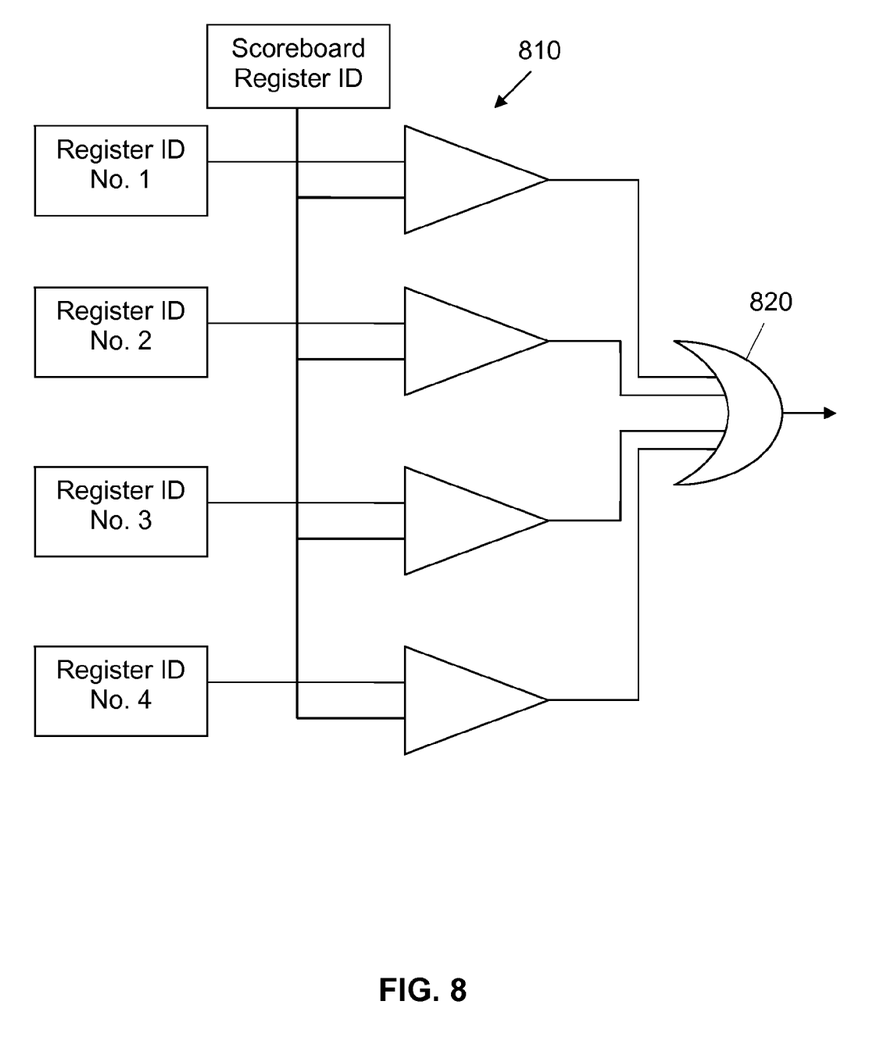
FIG. 8 illustrates a comparison unit additional detail.

FIG. 8 is a block diagram of one of the comparison units 610 shown in FIG. 6 using which step 712 of the flow diagram in FIG. 7 is carried out. The comparison unit 610 compares register IDs of source and destination registers specified in an instruction (labeled in FIG. 8 as Register ID Nos. 1-4) with a register ID stored in one of the storage areas allocated for the instruction's thread in the scoreboard memory 322. A bank of comparators 810 is provided to perform the comparison. If there is a match, the comparator 810 outputs a 1 value. If there is no match, the comparator 810 outputs a 0 value. The outputs of the comparators 810 are supplied to an OR gate 820 which outputs an aggregate OR result as the comparison result. A comparison result of 0 indicates there are no matches. A comparison result of 1 indicates there is at least one match.

Figure 9:
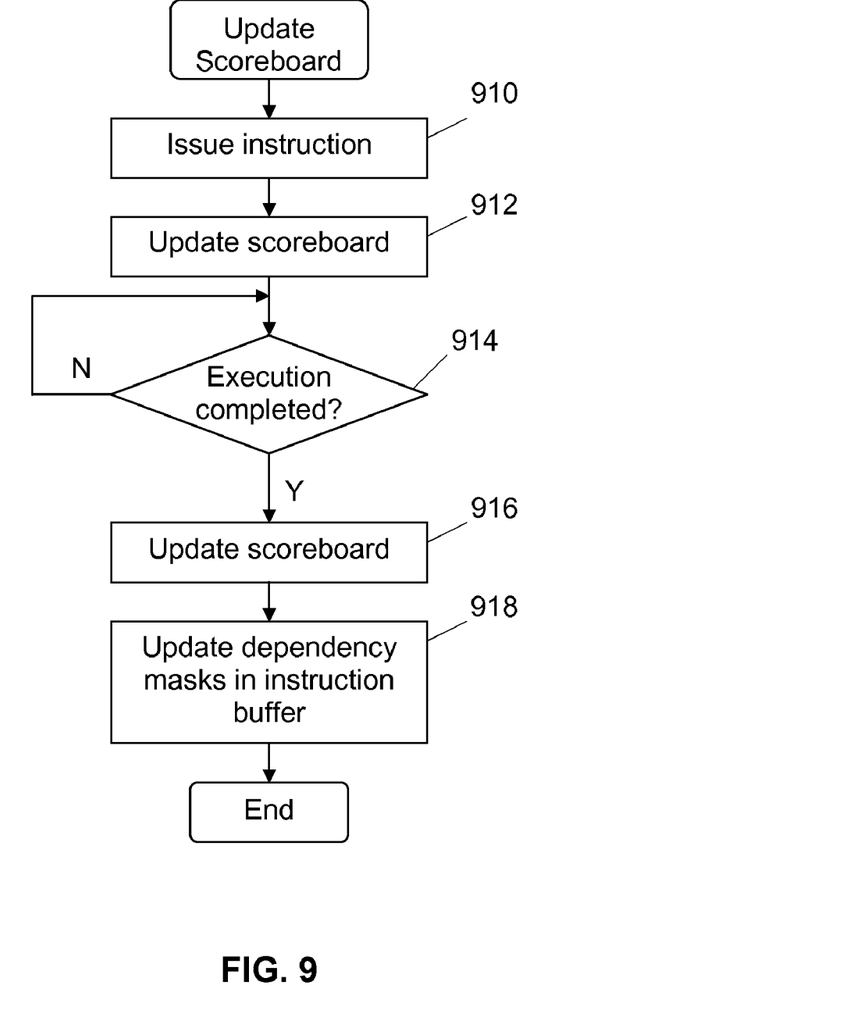
FIG. 9 is a flow diagram that illustrates the steps carried out to update the scoreboard memory when an instruction is issued out of the instruction buffer and executed.

FIG. 9 is a flow diagram that illustrates the steps carried out to update the scoreboard memory when an instruction is issued out of the instruction buffer and executed. In step 910, an instruction is issued out of the instruction buffer if: (i) the 6-bit dependency mask stored with the instruction has a zero value; and (ii) there is an available storage area in the region of the scoreboard memory 322 allocated to this instruction's thread. When the instruction is issued, the scoreboard memory 322 is updated by storing the register ID of the destination register specified in the issued instruction in the available storage area in the region of the scoreboard memory 322 allocated to this instruction's thread (step 912). If there are more than one destination registers specified in the issued instruction, the register ID of the first destination register specified in the issued instruction is stored in the available storage area in the region of the scoreboard memory 322 allocated to this instruction's thread. A size value indicative of the number of destination registers specified in the issued instruction is stored with the register ID. The issued instruction is then executed in one of the execution pipelines 222, 224, and when its execution completes (step 914), the scoreboard memory 322 is updated again (step 916). This time, the data stored in connection with step 912 are cleared from the scoreboard memory 322. Also, in step 918, the dependency masks stored in the instruction buffer 310 with the instructions to be issued are updated to reflect the change in the scoreboard memory 322. For example, if the third slot in Thread T0's is cleared, then all of the instructions belonging to Thread T0 and stored in the instruction buffer 310 will have the third bits of their corresponding dependency masks set to zero.

For simplicity of illustration, a thread as used in the above description of the embodiments of the present invention represents a single thread of instructions. The present invention is also applicable to embodiments where like threads are grouped together and the same instruction from this group, also referred to as a convoy, is processed through multiple, parallel data paths using a single instruction, multiple data (SIMD) processor.

While the foregoing is directed to embodiments of the present invention, other and further embodiments of the invention may be devised without departing from the basic scope thereof. The scope of the present invention is determined by the claims that follow.

What is claimed is:

1. A method of issuing instructions to be executed by a processing unit, comprising the steps of:
   receiving a single instruction to be issued that specifies a string of registers including source and destination registers;
   comparing register IDs in the string of registers with one or more register IDs of registers that have pending writes;
   generating an aggregate comparison result based on the comparison of the register IDs in the string of registers;
   issuing the single instruction for execution when the register IDs in the string of registers do not match any of the register IDs of registers that have pending writes; and
   storing in memory, for a destination register ID of the first destination register in the string of registers, a size indicator that is an integer that reflects only the number of sequential destination registers among the register IDs in the string of registers specified by the single instruction.

2. The method of claim 1, further comprising storing one or more register IDs of registers that have pending writes in the memory when instructions corresponding to the pending writes are issued.

3. The method of claim 2, further comprising removing the one or more register IDs of registers from the memory when instructions corresponding to the pending writes are completed.

4. The method of claim 1, wherein the step of comparing is carried out using the one or more register IDs stored in a location in the memory allocated to a thread of instructions that includes the single instruction to be issued.

5. The method of claim 1, wherein one or more least significant bits of the register IDs of registers that have pending writes are masked during the step of comparing if the size indicator associated with the register IDs of registers that have pending writes that are being compared is greater than 1.

6. The method of claim 1, wherein no significant bits of the register IDs of registers that have pending writes are masked during the step of comparing if the size indicator associated with the register IDs of registers that have pending writes that are being compared is equal to 1.

7. The method of claim 1, further comprising the step of, when an instruction that specifies a sequential string of registers that have pending writes is issued, storing only one register ID of the sequential string of registers in memory.

8. A computer system comprising:
a processing unit configured to execute multiple threads concurrently; and
a memory unit having separate regions allocated to each of the multiple threads, wherein each memory region allocated to a thread is configured to store register IDs of destination registers specified in instructions of said thread that have been issued and a size indicator for a first destination register in a string of registers specified by each single instruction, wherein the size indicator is an integer that reflects only the number of sequential destination registers among the register IDs in the string of registers specified in each single instruction.

9. The computer system of claim 8, wherein the processing unit further includes a comparison unit coupled to the memory unit and configured to:
receive register IDs of registers in the string of registers specified in a single instruction to be issued;
compare the register IDs in the string of registers with one or more register IDs of registers that have pending writes, wherein the string of registers includes source and destination registers; and
generate a multi-bit output based on the comparison of the register IDs in the string of registers, wherein the comparison unit includes a bank of comparators for each bit of the multi-bit output, and a bit level of each bit of the multi-bit output is set based on comparison results from a corresponding bank of comparators.

10. The computer system of claim 9, wherein all of the bits of the register IDs of registers specified in the instruction to be issued are compared by the comparison unit if the size indicator associated with a respective one of the register IDs that is being compared is equal to 1.

11. The computer system of claim 9, wherein one or more least significant bits of the register IDs of registers specified in the instruction to be issued are not compared by the comparison unit if the size indicator associated with a respective one of the register IDs that is being compared is greater than 1.

12. The computer system of claim 9, further comprising removing the register IDs of the registers that have pending writes from the memory regions when instructions corresponding to the pending writes are completed.

13. The computer system of claim 8, wherein, when an instruction that specifies a sequential string of registers that have pending writes is issued, the memory unit stores only one register ID of the sequential string of registers.

14. A method of tracking register usage for a plurality of threads, comprising the steps of:
allocating a memory region for each thread;
storing one or more register IDs of registers that have pending writes in the memory region allocated to a thread, when instructions of said thread that specify said one or more registers for pending writes are issued;
removing the one or more register IDs of registers that have pending writes from the memory region allocated to a thread, when instructions of said thread that specify said one or more registers for pending writes are completed; and
storing a size indicator with each of the one or more register IDs, wherein the size indicator is an integer indicating only the number of sequential destination registers specified in an instruction.

15. The method of claim 14, wherein the step of storing one or more register IDs includes the steps of:
extracting a destination register ID from an instruction that is issued;
determining a thread ID of the instruction that is issued;
determining the memory region where the destination register ID is to be stored using the thread ID; and
storing the destination register ID in the determined memory region.

16. The method of claim 15, further comprising the steps of:
determining a thread ID of an instruction to be issued;
extracting source and destination register IDs from said instruction to be issued;
comparing the source and destination register IDs with destination register IDs stored in the memory region allocated to the thread ID of the instruction to be issued; and
generating a multi-bit output for the instruction to be issued based on the results of the step of comparing.

17. The method of claim 16, further comprising the step of updating the multi-bit output for the instruction to be issued if instructions in the same thread as the instruction to be issued that specify registers with entries in the memory region are completed.

18. The method of claim 14, wherein the same maximum number of register IDs are stored per thread.

* * * * *